United States Patent [19]

Brooks et al.

[11] 3,901,810

[45] Aug. 26, 1975

[54] ULTRAFILTRATION MEMBRANES

[75] Inventors: Thomas William Brooks, McMurray; David William Gaefke, Coraopolis; Lawrence James Guilbault, McMurray, all of Pa.

[73] Assignee: Calgon Corporation, Pittsburgh, Pa.

[22] Filed: Sept. 21, 1972

[21] Appl. No.: 290,850

[52] U.S. Cl. ........... 210/500 M; 260/876 B; 264/41
[51] Int. Cl.$^2$ .................. B01D 33/00; B01D 13/00
[58] Field of Search .................. 210/22, 500; 55/16; 264/182, 41, 49; 260/878 R, 876 B, 2.5 M

[56] References Cited
UNITED STATES PATENTS

| | | | |
|---|---|---|---|
| 3,386,912 | 6/1968 | Lazare | 210/500 X |
| 3,497,573 | 2/1970 | Hostetler | 260/876 B |
| 3,607,977 | 9/1971 | Taylor et al. | 210/321 X |
| 3,652,724 | 3/1972 | Shimomura et al. | 260/876 B X |
| 3,675,391 | 7/1972 | Gallacher | 55/16 |
| 3,719,738 | 3/1973 | Fujii | 264/182 X |
| 3,723,306 | 3/1973 | Bridgeford | 210/22 |
| 3,786,116 | 1/1974 | Milkovich et al. | 260/878 R X |

OTHER PUBLICATIONS

Saline Water Conversion Report for 1970–1971, pages 315 & 316 relied on.

*Primary Examiner*—Frank A. Spear, Jr.
*Attorney, Agent, or Firm*—Harry E. Westlake, Jr.; Frank M. Mahon; Raymond M. Speer

[57] ABSTRACT

It is disclosed that ultrafiltration membranes may be made from solutions of segmented polymers having distinct hydrophilic portions and hydrophobic portions. A preferred segmented copolymer is one of poly(vinyl pyrrolidone) as the backbone segment with segments of poly (methyl methacrylate) grafted onto it. Other preferred membrane materials of this invention are condensation type random-block copolymers comprised of hydrophilic polyether glycols and hydrophobic dihydric phenol compounds. The membranes may be used in various membrane separation processes.

9 Claims, No Drawings

ULTRAFILTRATION MEMBRANES

BACKGROUND OF THE INVENTION

Ultrafiltration is a physical separation process whereby a solute of molecular dimensions significantly greater than the molecular dimensions of the solvent in which it is dissolved can be concentrated by pressure activated diffusion across a membrane which is permeable to the solvent but substantially impermeable to solute. Solutes of different molecular dimensions may be similarly separated. The utility of such a separation process lies in the fact that separations can be accomplished rapidly, under mild conditions, and at a relatively modest expenditure of energy. Evaporative processes such as distillation, spray drying, roller drying and the like, are, by contrast, relatively expensive in total energy requirements, and are poorly suited to separations involving temperature sensitive solutes such as, for example, proteins which are liable to denaturation and partial loss of solubility upon exposure to heat. A potential advantage of ultrafiltration over other separation means lies in the fact that by adjusting membrane selectivity one can effect separation not only of solvent from solute but also of individual solutes which differ significantly in molecular dimensions. That is to say, one can fractionate a mixture of different solutes by molecular size by means of the ultrafiltration process.

Successful application of the ultrafiltration process to a particular separation problem depends in large measure upon the characteristics of the membrane employed. Among the desirable characteristics of a practical membrane are the following:

1. High hydraulic permeability to solvent: The membrane must display high solvent flux per unit area at relatively low driving pressures.
2. Sharp "molecular size cut-off": The membrane should be capable of retaining all or essentially all solutes of molecular size above some specified value while allowing transmission of all solutes below the specified value. This characteristic is related to uniformity of composition and technique of casting the membrane.
3. Chemical stability: The membrane should be chemically inert to the environment in which it is operated.
4. Mechanical stability: The membrane should be capable of withstanding load forces imposed by pressures employed in its operation and to repeated cycling of such a load where the nature of the separation process requires pressure cycling.
5. Thermal stability: The membrane should be resistant to damage by exposure to temperature ranges which may be typical of a particular contemplated application.
6. Resistance to damage by wet-dry cycling: For shipping, storage, and sanitary purposes it is frequently desirable to leave the membrane in a dry state. Resistance to damage by wet-dry cycling is a necessary characteristic when such conditions must be met.
7. Resistance to fouling: The membrane must be resistant to fouling by the solutes, solvents, or colloidal materials to which it is exposed in its operation.

Membranes which have been used commercially for reverse osmosis and ultrafiltration have been almost universally made from cellulose derivatives. See, for example, Manjikian U.S. Pat. No. 3,344,214. However, many other types of membranes have been proposed. For example, poly urethanes are proposed in Canadian Pat. No. 860,214. Certain types of epoxy polymers are suggested in U.S. Pat. No. 3,567,631 to Lukach et al and British Pat. Nos. 1,222,053 and 1,227,665. Alkylene oxides are combined with allyl glycidyl ethers in Lukach U.S. Pat. No. 3,567,630. Certain variations of poly alkylenes are proposed as membrane-forming materials in Baddour et al U.S. Pat. No. 3,299,157, and they are copolymerized with other materials in German Pat. Nos. 1,936,679 and 2,009,336. Diacetone acrylamide has been proposed to form membranes in Hoke U.S. Pat. No. 3,585,125. Poly vinyl chloride is used in Bloch et al. U.S. Pat. Nos. 3,450,630 and 3,450,631. Poly(vinyl chloride) is combined with other monomers such as sulfones and phenylene oxides in Berger U.S. Pat. No. 3,567,666. Various types of nitrogen-linked polymers are used in a U.S. Pat. No. 3,567,632 issued to Richter et al and Richter et al U.S. Pat. No. 3,619,424; they also appear in British Pat. No. 1,227,280, French Pat. No. 1,587,787, and German Pat. No. 2,033,526. Various other copolymers may be mentioned such as phenol formaldehyde, as discussed in Foote et al U.S. Pat. No. 3,009,578 and Olson et al U.S. Pat. No. 3,450,632, and variations of styrene butadiene copolymers such as are discussed in German Pat. No. 2,044,509. None of these has been particularly successful in commerce for ultrafiltration membrane separation processes.

Previous attempts to utilize synthetic copolymers comprised of randomly placed hydrophilic and hydrophobic comonomers as membrane materials for pressure activated separatory processes have met with only limited success (see, for example, Block and Vieth, *J. Appl. Polym. Sci.*, 13, 193 [1969]). Such membranes are generally deficient with respect to one or more of the aforementioned desirable characteristics.

Certain other types of proposed polymer compositions should be mentioned for the purpose of the background of our invention. Among these are the so-called anisotropic membranes developed by various workers at Amicon Corporation and described in U.S. Pat. Nos. 3,549,016 (Rigopulos), 3,556,305 (Shorr), 3,556,992 (Massucco), 3,567,810 (Baker), and British Pat. No. 1,238,180. Similarly, it has been suggested to treat membrane sheets which have already been formed, such as cellulose membranes, to vary their porosity or other characteristics. See Steigman et al U.S. Pat. No. 3,457,256. Bieher et al in U.S. Pat. No. 2,884,387 disperses water-soluble or water-swellable polymers in a solution of water-insoluble polymer and then casts a membrane.

An oleophylic polymer membrane is suggested in Gulko U.S. Pat. No. 3,556,990.

The use of block copolymers is proposed in Winkler U.S. Pat. No. 3,577,357. The preferred block copolymers in this application are made of sulfonated poly vinyl arene blocks and alpha olefin elastomeric blocks. Block and graft copolymers of specific structures are discussed by Brooks and Daffin in a presentation to the Polymer Chemistry Division of the American Chemical Society in 1969.

German Pat. No. 1,939,012 proposes a specific randomly distributed graft polymer of oxyethylene and poly(oxyethylene) onto polyamides, polyureas, and polyurethanes as a membrane particularly suitable for desalination. See also U.S. Pat. No. 3,666,693.

We are aware of the use of poly(vinyl pyrrolidone) in combination with polyisocyanates to form a series of hydrophilic membrane materials. These compositions are reported in V. 8, No. 2, of *Disalination*, October, 1970, pp 177-193.

The grafting of certain constituents to substantially linear nitrogenous condensation polymers is discussed by Tanner in U.S. Pat. No. 3,099,631 and also by Pye in U.S. Pat. No. 3,554,379.

So far as we know, no attempt has been made, in the use of any of the above-discussed membrane compositions, to control their permeabilities or their hydrophobic/hydrophilic characteristics through the use of grafting or segment copolymerization, particularly of grafting a hydrophobic chain onto a hydrophilic backbone.

SUMMARY OF THE INVENTION

This invention relates to novel membrane materials and to methods for their fabrication into useful membranes capable of effecting the separation of relatively high molecular weight solutes from aqueous solutions or other aqueous media. The novel membrane materials of this invention are segmented copolymers having strongly hydrophilic or water-soluble polymer segments to which are chemically bonded hydrophobic polymer segments. The graft or random-block copolymers so constituted are water insoluble but are soluble in organic solvents, making it possible to cast them into films by solvent casting techniques. The hydrophilic segments serve to impart water permeability to derived films or membranes while the hydrophobic segments serve to insolubilize the material in water and impart necessary mechanical strength to derived films or membranes.

By a "polymer segment," I mean a linear chain of repeating identical polymerized monomeric units. Such a homopolymeric chain, as used herein, will have at least five monomeric units in its segment length.

By a "hydrophobic polymer segment," I mean one which will exhibit a high glass transition temperature, i.e., one which is in excess of 100°C. The hydrophobic moiety should hold its shape; that is, it should not be an elastomer but may be thermoplastic. The glass transition temperature is the point at which a high polymer changes from a glassy rigid state to a viscoelastic state. It may be measured by dilitometry, differential scanning calorimetry, or differential thermal analysis. The segments should be long enough to lend a significant measure of rigidity. At least one of the hydrophobic segments should have a length of at least 100 mer units. The hydrophobic moiety should not swell or dissolve in water; it should be soluble in organic solvents. Among the useful hydrophobic polymer segments are segments of polystyrene, polymethyl methacrylate, bisphenol A polycarbonate, and polyphenylene oxide.

Hydrophilic segments suitable for polymers of this invention should exhibit an affinity for water ranging from a tendency to absorb a significant amount of water (i.e., greater than 10 percent by weight) to full solubility in water. The hydrophilic segments should contain one or more reactive sites for attachment of the hydrophobic segments. Among the useful functional groups or reactive sites are hydroxyl groups, amino groups and groups which can be transformed into polymerization initiator sites of the free radical, cationic or anionic types. Block polymers result when hydrophobic segments are attached to reactive sites located at the terminal ends of the hydrophilic segments. Graft polymers result from attachment of hydrophobic segments at reactive sites located along the hydrophilic segment chain. Suitable hydrophilic segment polymers include poly(vinyl pyrrolidone), poly(vinyl alcohol), cellulose, poly(acrylamide), poly ether glycols and various copolymers exhibiting hydrophilic characteristics.

The segment length (molecular weight) of the hydrophilic and hydrophobic segments may be varied over a wide range to control the transport characteristics of derived membranes.

We have prepared useful membranes with hydrophilic segments having a molecular weight range of 600 to 360,000. Hydrophobic segment molecular weights have ranged from 1,000 to 500,000. The prime consideration is that the molecular weight of the segmented polymer is sufficiently high to allow casting into films with acceptable mechanical integrity. Depending on the chemical structure of the individual segments, molecular weights of several thousand to several million are preferred. Minimum overall molecular weight is on the order of at least 10,000. The ratio of hydrophilic to hydrophobic segment may be varied over a wide range, limited by the requirements of water insolubility and water permeability. We have found that segmented polymers containing from 3 to 60 mole percent hydrophilic monomer provide useful membranes.

The segmented polymers used in this invention may be prepared in a variety of methods, familiar to those skilled in the art. Segmented polymers of the graft polymer type may be prepared by graft polymerizing a hydrophobic monomer onto a preformed hydrophilic polymer segment containing graft reactive sites along the backbone via condensation or chain addition reaction. Alternatively, preformed hydrophobic polymer segments may be grafted directly to preformed hydrophilic polymer segments. Segmented polymers of the block polymer type may also be prepared by a variety of methods. One may, for example, couple preformed hydrophilic and hydrophobic segments possessing mutually reactive functional groups at the segment chain ends. Alternatively, one may prepare hydrophilic or hydrophobic segments possessing terminal groups capable of generating free radical sites, which when activated in the presence of monomers of opposite philicity lead to the formation of segmented block polymers. Condensation polymerization reactions utilizing preformed terminally functional segments, monomers of opposing philicity and suitable condensing agents provide another route to segmented block polymer synthesis. Furthermore, the well-known syntheses of block polymers via sequential anionic and cationic initiation techniques may be conveniently employed in preparing the segmented polymer of this invention. Segmented copolymers such as these, in which a hydrophilic backbone polymer is grafted with hydrophobic branch chains, are uniquely suited to the fabrication of membranes by virtue of their peculiar structure and the effect this structure has on the gross morphology of films prepared from them by solvent casting or other means. It is well known that dissimilar homopolymers are mutually incompatible and that if one attempts to prepare a film or other shaped object from a mixed solution or mixed melt of two dissimilar homopolymers a microphase separation of the two species may result. With block and graft copolymers in which two dissimilar polymer chain segments are united chemically a similar phenomenon occurs except that in this case the distinct phases are bound to one another at their interface by chemical bonds. The subject of microphase separation is reviewed at length and in detail by Tobolsky et al in *Macromolecular Reviews*, V. C4, (1970), pp 313–366, particularly with respect to applications in the areas of synthetic fiber and rubber technology.

In the practice of this invention, advantage is taken of the two-phase morphology as a means of achieving high flux selectively permeable membranes. We have found that segmented polymers comprising a hydrophilic segment to which has been chemically bonded hydrophobic branch chains may be cast into films which function as excellent ultrafiltration membranes.

A casting solvent should be chosen which is a better solvent for the hydrophilic polymer segments than for the hydrophobic segments so that the resulting film or membrane will display a gross morphology in which the hydrophilic portion of the system exists as a continuous phase while the hydrophobic portion is present as a disperse phase. The membrane system will include segregated domains of hydrophobic segments dispersed in a background of the hydrophilic polymer segments. By the same token, if a casting solvent is selected such that it is a better solvent for the hydrophobic polymer segments than for the hydrophilic segments the phase relationships in resulting films will be reversed and the film will not function as a membrane for aqueous media but will behave more as a hydrophobic film displaying virtually no water permeability. Thus, in the practice of this invention the choice of casting solvent as well as the structure of the graft copolymer is critical to achieving useful membranes. As guides to proper selection of solvent or solvent combinations one may refer to the tables of solubility parameters and solvents and non-solvents for polymers in the *Polymer Handbook*, edited by Bandrup and Immergut, Interscience, 1966.

Typical of the membrane materials which are the subject of this invention is a graft copolymer obtained by grafting the water-soluble polymer, poly(vinyl pyrrolidone), with methyl methacrylate. Any of a number of grafting methods, which will be known to those practiced in the art, may be employed to accomplish the desired synthesis. We have found the ceric ion method taught by Mino and Kaizerman in U.S. Pat. No. 2,922,678 to be a convenient means of accomplishing the desired graft copolymer synthesis. Compositions of the graft copolymers are expressed, for convenience, in mole percent based on the repeating unit formula weights of repeating units in the individual segments. Composition may be varied over a relatively wide range. Generally, however, it is preferable to employ segmented copolymers in which the balance of hydrophobic and hydrophilic character is controlled such that derived films or membranes are not subject to excessive inhibition of water or swelling in an aqueous medium. In the case of poly(vinyl pyrrolidone-g-methyl methacrylate) graft copolymers compositions in the range of 5 to 40 mole percent vinyl pyrrolidone are useful and compositions in the 10 to 20 mole percent vinyl pyrrolidone range are preferred. The PVP-MMA graft copolymer is soluble in a variety of organic solvents including methylene chloride, chloroform, acetone, dimethyl formamide, pyridine, and acetic acid. Acetic acid was found to be a particularly useful casting solvent. Methylene chloride or chloroform on the other hand were found to be poor casting solvents for our purposes because they yield films which are essentially water impermeable and, therefore, of no use as membranes in aqueous systems. These solvents are more effective for the hydrophobic portions of the membrane than they are for the hydrophilic portions. Casting dopes may be prepared by dissolving graft copolymer in acetic acid up to concentrations in the range of about 5 to 10 percent by weight. In order to obtain films of even thickness casting dope viscosity should be in the range of 20 to 30,000 centipoise. Casting dope compositions containing 5 to 10 percent by weight graft copolymer have viscosities suitable for casting membranes in flat sheet form or on porous tubular support structures. Cast films yield high flux membranes if they are gelled by immersion in water after a relatively short evaporation period. The evaporation period at ambient temperature (20° to 30° C) may be varied but cannot exceed 15 to 20 minutes without sacrificing permeability after the evaporation period. Retentiveness of membranes made from the graft copolymer is enhanced by heat treatment in water at 75° to 95°C. Treatment temperature and length of time may be varied considerably.

Furthermore, we have found that the permselectivity of PVP-g-MMA membranes can be controlled by the graft frequency or number of hydrophobic poly(methyl methacrylate) segments attached to the hydrophilic poly(vinyl pyrrolidone) backbone segment. We believe that the graft frequency affects the mobility of the poly(vinyl pyrrolidone) segments among the hydrophobic graft segments, which in turn controls the permselectivity of derived membranes. Our studies indicate that the graft frequency of PVP-g-MMA prepared by the ceric ion technique is quite low, on the order of two hydrophobic graft segments per hydrophilic backbone segment. The permselectivity of PVP-g-MMA membranes may be increased by increasing the graft frequency. We have found it convenient to increase the graft frequency by the incorporation of minor proportions of a comonomer having a high grafting efficiency into the poly(vinyl pyrrolidone) backbone segment. A preferred comonomer for this purpose is N-methacrolyl-D-glucosamine (N-MAG), the homopolymer of which has been demonstrated to exhibit an unusually high grafting efficiency by Iwakura et al, *J. Polym. Sci.*, 6, 1625 (1968). Membranes prepared from PVP-g-MMA containing 5 to 15 percent N-MAG in the hydrophilic backbone have higher grafting frequencies and greater permselectivities than non N-MAG based membranes.

Other typical polymers of this invention have the following generalized structure:

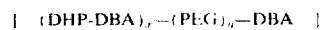

where DHP represents the structural unit derived from the dihydric phenol compound upon condensation with the dibasic acid halide, DBA. Examples of dihydric phenol compounds that may be employed in this invention include, 2,2-bis-(4-hydroxyphenyl)-propane (bisphenol-A); 2,4'-dihydroxydiphenyl-methane; bis-(2-hydroxyphenyl)-methane; bis-(4-hydroxyphenyl)-methane; bis-(4-hydroxy-5-nitrophenyl)-methane; bis-(4-hydroxy-2,6-dimethyl-3-methoxyphenyl-methane;

1,1-bis-(4-hydroxy-phenyl)-ethane; 1,2-bis-(4-hydroxyphenyl)-ethane; 1,1-bis-(4-hydroxy-2-chlorophenyl)-ethane; 1,1-bis(2,5-dimethyl-4-hydroxyphenyl)-ethane; 1,3-bis(3-methyl-4-hydroxyphenyl)-propane; 2,2-bis-(3-phenyl-4-hydroxyphenyl)-propane; 2,2-bis-(3-isopropyl-4-hydroxyphenyl)-propane; 2,2-bis-(4-hydroxynaphthyl)-propane; 2,2-bis-(4-hydroxyphenyl)-pentane; 3,3-bis-(4-hydroxyphenyl)-pentane; 2,2-bis-(4-hydroxyphenyl)-heptane; bis-(4-hydroxyphenyl)-phenyl methane; bis-(4-hydroxyphenyl)-cyclohexyl methane; 1,2-bis-(4-hydroxyphenyl)-1,2-bis-(phenyl)-ethane; 2,2-bis-(4-hydroxyphenyl)-1,3-bis-(phenyl)-propane; 2,2-bis-(4-hydroxyphenyl)-1-phenyl propane; and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. The DHP need only exhibit sufficient hydrophobicity to impart water insolubility to the derived membranes.

DBA represents the structural unit derived from the dibasic acid halide upon condensation with the dihydric phenol compound or the polyether glycol, PEG. When phosgene is utilized as the dibasic acid halide, the structure of DBA is merely

and the polymers may be classified as polycarbonates. In the case of other phosgene-like dibasic acid halides the structure of DBA is

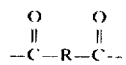

where "R" may be alkyl, aryl or substituted derivatives thereof and the polymers may be classified as polyesters. Useful dibasic acid halides include adipoyl chloride, sebacoyl chloride, terephthaloyl chloride and the like.

PEG represents the structural unit derived from polyether glycols upon condensation with DBA. The polyether glycols have the structure $HO—(RO)_m—H$ where R is alkyl, aryl or substituted aryl, such that the molecule is sufficiently hydrophilic to impart water permeability to membranes derived from the random-block copolymers. Especially useful PEG compounds include poly (ethylene oxide) glycol, poly (propylene oxide) glycol, etc.

As will be obvious in the examples to follow, the values of $x$ and $y$ in the general structure and $m$ in the PEG portion may be varied widely to achieve a variety of membranes with a broad range of transport properties.

A preferred membrane material of this type is a random-block copolycarbonate obtained by phosgenation of the dihydric phenol 2,2-bis(4-hydroxyphenyl)-propane, (bisphenol A) and poly(ethylene oxide) glycol.

A third, preferred segmented polymer of this invention is the random block polymer poly(styrene-b-ethylene oxide). This polymer may be prepared conveniently by the method taught by Tobolsky (U.S. Pat. No. 3,291,859) wherein a poly(ether) glycol, styrene monomer, an organic diisocyanate and a bis(active hydrogen) peroxide are combined and heated to cause simultaneous polymerization of the styrene and coupling of the resulting polystyrene segments with the poly ether glycol segment.

Our invention contemplates segmented copolymers (including graft copolymers) in which the hydrophilic segments or backbones comprise from about 3 mole percent to about 60 mole percent and also are present in segments of at least 15 monomer units.

The nature of this invention is further illustrated by the following examples.

EXAMPLE 1

Preparation of poly (vinyl pyrrolidone-g-methyl methacrylate) graft copolymers may be carried out in the following way:

A solution of 10 grams of poly (vinyl pyrrolidone) (nominal molecular weight 360,000) in 567 grams of distilled water is purged for 1 hour with nitrogen. To this solution is added 36 grams of inhibitor free methyl methacrylate and the mixture is stirred under a continuing purge of nitrogen for an additional 5 minutes. Ceric ion catalyst solution, 7 milliliters, consisting of 0.1N ceric ammonium nitrate in 1.0N nitric acid is then introduced and the reaction allowed to proceed for 5 hours during which time graft copolymer precipitates as a highly swollen gelatinous mass. Product is recovered by coagulation with methanol and ether followed by filtration. Traces of ungrafted poly(vinyl pyrrolidone) may be removed from the product by extraction with hot methanol. Conversion is generally 90 to 100 percent and composition as determined by nitrogen analysis is 18±2 mole percent in vinyl pyrrolidone. Other compositions may be prepared in essentially the same manner by making appropriate adjustments in the reactant charge.

EXAMPLE 2

This example describes the preparation of poly(vinyl pyrrolidone-g-methyl methacrylate) on a larger scale.

A Nucerite glass-lined 50 gallon Pflaudler Reactor Kettle (No. E165-0601) was charged with 195.17 pounds of distilled water. Agitation was begun (90 rpm) and 3.67 pounds (20 mole percent) of K-90 PVP (93.4 percent active) was slowly charged to the reactor. The temperature of the resulting polymer solution was equilibrated at 25°C and a 1 hour purge with nitrogen at 68 SCFH was begun. At the end of the purge period, the purge rate was reduced to 20 SCFH and 12.39 pounds (80 mole percent) of purified methyl methacrylate was charged to the reactor. The purge rate was maintained for 5 minutes and then switched to a blanket just prior to catalyst addition. While maintaining a 25° hold temperature, 1090 milliliters of catalyst solution (54.82 grams $(NH_4)_2 Ce(NO_3)_6$/liter 1N $HNO_3$) were added and the reaction continued for 5 hours.

The resulting reaction product was neutralized to pH 7 with 50 percent NaOH and acetone was added (2:1 by volume) to coagulate the polymer. The product was fed to a Tolhurst 1B8 centrifuge to collect the polymer. The partially dried polymer was then charged to a 50 gallon Croen kettle containing methanol at 55° to 60°, (methanol:polymer ratio 20:1) after agitation for 30 minutes the methanol/polymer slurry was centrifuged to near dryness. The polymer cake was then dried in a vacuum pan dryer for 16 hours at 60°C and 29 inches of vacuum and crushed. The product, obtained in 85 percent yield, contained 20 mole percent vinyl pyrrolidone.

EXAMPLES 3 – 11

The following examples demonstrate the ultrafiltration performance characteristics of membranes prepared from graft copolymers synthesized as described in Example 1 above.

Flat sheet membranes are prepared by casting a solution of graft copolymer in an appropriate solvent onto a clean glass plate, allowing the film to evaporate for 10 to 15 minutes, and finally gelling the film by immersion in a water bath. Sufficient time is allowed for casting solvent to be completely leached from the film which floats free from the glass surface. If desired, films may be annealed by immersion in a thermostated water bath for a specified period of time prior to testing. Circular test membranes are cut from the film and installed in a reverse osmosis/ultrafiltration test cell of the type sold commercially by Universal Water Corporation. Test solutions contained poly(ethylene oxide) glycols of known molecular weight as solutes. Ultrafiltration performance is characterized by measuring product water flux and solute rejection. The retentiveness or selectivity toward a particular solute is expressed as percent rejection which is defined as $$\% R = \frac{C_1 - C_2}{C_1} \times 100$$

where $C_1$ = solute concentration in the feedstream
$C_2$ = solute concentration in the product water stream Typical test results obtained with various compositions of graft copolymer fabricated into membranes under a variety of conditions are tabulated below.

poly (vinyl) pyrrolidone-g-methyl methacrylate) graft copolymer 10 – 17 mole percent in vinyl pyrrolidone by casting from moist acetic acid solutions give membranes having a nominal molecular weight cut-off of 15,000. In the following examples performance results are shown for tubular membranes prepared by casting the same graft copolymer composition onto the inner walls of a 0.5 inch inside diameter porous filament wound fiber glass tubular support structure of the kind described in U.S. Pat. No. 3,457,170. Ultrafiltration test results with a feed solution containing 7 to 8 percent 20 KPEG using 10 inch sections of the tubular membranes are tabularized below.

| Example | Anneal Temp.°C | Anneal Time, Minutes | 300 psi[a] Flux, gfd | % Rej. 20 KPEG |
|---------|----------------|----------------------|----------------------|----------------|
| 12 | 85 | 7 | 6.0 | 87 |
| 13 | 85 | 5 | 6.1 | 90 |
| 14 | 85 | 6 | 4.3 | 88 |
| 15 | 85 | 5 | 5.1 | 86 |
| 16 | 87 | 5 | 5.0 | 88 |

[a]Test conditions are as follows:
Feed solution: 7 – 8 percent by weight 20 KPEG in water
Feedstream flow velocity: 3.0 feet per second
Temperature: 25 + 2°C

EXAMPLES 17 – 21

In the following examples it is demonstrated that the retentivity of poly (vinyl pyrrolidone-g-methyl methacrylate) (10 – 17 mole percent VP) graft copolymer membranes can be improved by appropriate thermal conditioning. Tube cast membranes are treated by immersion in a thermostated water bath at various temperatures and tested for rejection of 6 KPEG. The tabu-

| Example | Polymer Comp. Mole % VP[a] | Casting Solvent[b] | Anneal Temp.[c] | 6 KPEG[d] Flux/Rej. gfd/% | 20 KPEG[d] Flux/Rej. gfd/% |
|---------|---------|---------|---------|---------|---------|
| 3 | 10–17 | AA | NA | 13/28 | 12/86 |
| 4 | 10–17 | AA +1.0% H₂O | NA | 8/77 | 7/92 |
| 5 | 10–17 | AA +0.3% H₂O | 87.5°C | 15/60 | 16/77 |
| 6 | 10–17 | AA +1.1% H₂O | NA | 14/34 | 7/87 |
| 7 | 10–17 | EA/CF | 93°C | 25/7 | 7/88 |
| 8 | 10–17 | EA/CF | 90°C | 8/64 | 7/88 |
| 9 | ~39 | AA | NA | 2/75 | 3/71 |
| 10 | ~39 | AA | 88°C | — | 4/78 |
| 11 | ~ 3 | AA +0.4% H₂O | 85°C | — | 8/92 |

[a]Graft copolymer composition is expressed as mole percent vinyl pyrrolidone (VP) based on repeating unit formula weight.
[b]Casting dope formulations 5 percent by weight in graft copolymer. AA — acetic acid, EA/CF — ethyl alcohol/chloroform 50/50 (V/V).
[c]Films were annealed in water for 3 to 8 minutes at the specified temperatures. NA — not annealed
[d]6KPEG = poly (ethylene oxide) glycol of molecular weight 6,000 to 7,500. 20 KPEG = poly (ethylene oxide) glycol of molecular weight 15,000. Test solutions were 7 to 8 percent by weight and operating pressure 300 psi. Flux is given as gallons/square foot/day (gfd).

EXAMPLES 12 – 16

Results with flat sheet membranes shown in Example 3 through 11 indicate that membranes fabricated from lated data show that as annealing temperature is increased retentivity of the solute which has a molecular weight of 6,000 to 7,500 is enhanced.

| Example | Anneal Temp°C | Anneal Time, Minutes | 300 psi Flux, gfd | %Rej.* 6 KPEG |
|---|---|---|---|---|
| 17 | 83 | 5 | 12 | 35 |
| 18 | 85 | 7.5 | 11 | 58 |
| 19 | 87 | 5 | 12 | 68 |
| 20 | 93 | 5 | 9 | 65 |
| 21 | 95 | 5 | 12 | 71 |

*Feed solutions were 3.75 to 5.5 percent by weight in 6 KPEG, feed velocity was three feet per second.

EXAMPLES 22 – 23

In many practical situations an ultrafiltration membrane may have to withstand exposure to strongly acidic or strongly alkaline feed stream conditions. The following data show that poly (vinyl pyrrolidone-g-methyl methacrylate) (10 – 17 mole percent VP) graft copolymer membranes which are of the flat sheet variety retain their selectivity and permeability when exposed for extended periods to feedstreams which are strongly acid or alkaline.

| Exam. | Feedstream* pH | Time of Exposure, Hrs. | 300 psi* Flux, gfd | %Rej.* 20 KPEG |
|---|---|---|---|---|
| 22 | 6 | 24 | 7.3 | 92 |
|  | 2.5 | 24 | 7.4 | 92 |
|  | 11.6 | 24 | 6.0 | 89 |
| 23 | 6 | 24 | 6.7 | 92 |
|  | 2.5 | 24 | 5.9 | 92 |
|  | 11.6 | 24 | 5.0 | 89 |

*Feed solutions were 7 to 8 percent by weight in 20 KPEG and were adjusted to pH 2.5 with nitric acid and to pH 11.6 with sodium hydroxide.
*Flux and rejection measurements were taken at the end of the test period.

EXAMPLE 24

In this example resistance of poly (vinyl pyrrolidone-g-methyl methacrylate) (10 to 17 mole percent VP) membranes to damage by wet-dry cycling is demonstrated. A tubular membrane was tested for ultrafiltration performance against a feed solution 8 percent by weight in 20 KPEG and found to give, at an operating pressure of 300 psi, a flux of 6.0 gfd and a rejection of 87 percent. After allowing the membrane to dry out for 4 days it was retested under the same conditions and found to give a flux of 5.3 gfd and 87 percent rejection of 20 KPEG. The membrane again was allowed to dry out for 2 days, resubmitted to testing and found to give a flux of 6.1 gfd and 90 percent rejection of 20 KPEG. It is thus shown that ultrafiltration performance characteristics are not materially effected by wet-dry cycling.

EXAMPLES 25 – 35

In these examples, the improvement in membrane permselectivity obtained by increasing the graft frequency is demonstrated.

Type 1 PVP-g-MMA graft polymers utilized commercial poly (vinyl pyrrolidone) as the backbone polymer (PVP K-90, GAF Corporation, molecular weight 3.6 × 10$^5$).

Type 2 graft polymers utilized vinyl pyrrolidone/N-MAG copolymers prepared in non-aqueous medium as the backbone polymer. A typical preparation of the backbone polymer is given here. A 100 milliliter, three-necked flask fitted with stirrer, condenser and nitrogen purge tube was charged with 10.0 grams distilled vinyl pyrrolidone, 2.47 grams N-MAG, 70 milliliters dried, distilled benzene and 0.063 grams AIBN. after a 30 minute nitrogen purge, the stirred suspension was heated at 62° for 16 hours. The resulting viscous slurry was precipitated into ether, the solids collected and dried in vacuo at 40°. The yield was 11.3 grams, $\eta_{spic}$ = 0.6 (0.5 percent in H$_2$O at 25°). Infrared analysis indicated that the polymer contained 10.5 mole percent N-MAG. Polymerization solvents other than benzene (i.e., pyridine, DMF, N-methyl pyrrolidone) afforded lower molecular weight polymers, even though the reactions were homogeneous.

Type 3 graft polymers utilized vinyl pyrrolidone/N-MAG copolymers prepared in aqueous medium as the backbone polymer. A typical preparation of the backbone polymer is given here. A 100 milliliter, three-necked flask fitted with stirrer, condenser and nitrogen purge tube was charged with 1.24 grams N-MAG, 10.55 grams vinyl pyrrolidone and 50 milliliters boiled, distilled water. After a 30 minute nitrogen purge, 0.15 milliliters LUPERSOL II catalyst solution was added and the contents heated at 42° for 16 hours. The resulting viscous solution was precipitated into acetone and the sticky solid was dried in vacuo at 50°. Yield was 11.7 grams, [ $\eta$ ] = 1.6 (HOAc at 25°). Infrared analysis indicated that the polymer contained 5.1 mole percent N-MAG.

The three types of backbone polymers were grafted with methyl methacrylate according to the procedure of Example 1.

Evidence for the graft polymer structures was obtained from hydrolysis experiments. The PMMA blocks of Type 1 copolymers were quantitatively cleaved by treatment with 35 percent nitric acid at 105° for 50 hours. When Type 3 copolymers were similarly treated, a high molecular weight PMMA homopolymer was obtained, along with a VP/MMA copolymer rich in VP. The former derives from the PMMA grafted to PVP directly and the latter represents the PVP with PMMA chains attached at the N-MAG units. PMMA chains attached to N-MAG units along the backbone appear to be quite resistant to acid hydrolysis. Likewise the PMMA chains on Type 2 polymers are resistant to nitric acid cleavage; the infrared spectrum of the polymer after hydrolysis being virtually identical to that of the initial material.

The graft polymers were dissolved in acetic acid at a concentration of 1 percent and pressure filtered through a Gelman 0.45 μ polypropylene filter. The filtered solutions were then concentrated to 4 to 7 percent solids by removal of acetic acid on a rotary solvent evaporator.

Membranes were cast onto glass plates using a doctor blade set at 10 to 20 mils. After a predetermined evaporation period, ranging from 2 minutes to 16 hours, the castings were quenched in water. Membrane sections were then cut from the casting and tested in the flat cell test loop against 0.5 percent MgSO$_4$ at 800 psi.

Membrane characterization data for the three types of graft polymers is tabulated in the following table. Low molecular weight test solutes were selected to provide a critical comparison of the three types of graft polymers. These results indicate that the rejection of low molecular weight solutes by PVP-g-MMA membranes can be increased by increasing the graft frequency.

| Ex. | Graft Polymer Type | Final Comp. (Mole % VP) | Backbone Comp. (Mole % N-MAG) | Solute (0.05 M) | Pressure (psi) | Flux (gfd) | Rejection (%) |
|---|---|---|---|---|---|---|---|
| 25 | I | 20 | 0 | MgSO$_4$ | 1,200 | 2 | 26 |
| 26 | I | 20 | 0 | NaCl | 1,200 | 2 | 20 |
| 27 | I | 32 | 0 | MgSO$_4$ | 1,200 | 9 | 11 |
| 28 | I | 32 | 0 | NaCl | 1,200 | 2 | 16 |
| 29 | I | 20 | 0 | NaCl | 800 | 8 | 16 |
| 30 | II | 20 | 5 | MgSO$_4$ | 800 | 4 | 28 |
| 31 | II | 20 | 10 | MgSO$_4$ | 800 | 1 | 52 |
| 32 | II | 20 | 15 | NaCl | 800 | 2 | 33 |
| 33 | III | 20 | 5 | MgSO$_4$ | 800 | 1 | 49 |
| 34 | III | 10 | 5 | MgSO$_4$ | 800 | 3 | 54 |
| 35 | III | 10 | 10 | MgSO$_4$ | 800 | 1 | 57 |

EXAMPLE 36

Dihydric phenol compound/polyether glycol random-block copolymers can be prepared by a variety of methods, such as, for example, the methods taught by Goldberg (U.S. Pat. No. 3,207,814) or Merrill (J. Polym. Sci., 55, 343 [1961]). One may, for example, treat a mixture of the dihydric phenol compound and polyether glycol in a suitable solvent with phosgene or a phosgene-like dibasic acid halide. Alternatively, one might prepare the dihaloformate of one of the components by reaction with phosgene or a phosgene-like dibasic acid halide, and then in a separate step react this product with the second dihydroxy compound.

This example demonstrates the preparation of a bisphenol A (BPA)/poly(ethylene oxide) glycol (PEO) random-block copolycarbonate by the phosgenation technique. Preparation of BPA/PEO containing 35 mole percent ethylene oxide, in PEO blocks of 1,000 MW: into a 1 liter resin kettle fitted with a gas delivery tube, efficient stirrer and reflux condenser (connected to a caustic trap) was added a solution of 68.63 grams (0.30 mole) bisphenol A and 6.37 grams (0.145 mole) CARBOWAX PEO 1,000 (Union Carbide Corporation) in 500 milliliters dry, distilled pyridine. Phosgene gas was bubbled into the stirred solution for 1.5 hours. During this period the initially clear solution became a black heterogeneous viscous mass. The polymer was isolated by precipitation into isopropanol in a Waring Blendor, followed by washing with this solvent until the filtrate was clear. After drying the crude polymer in vacuo at 60°, it was purified by precipitation from a filtered chloroform solution into methanol and redried to yield 82 grams of white fibrous solids (96 percent conversion). Other compositions may be prepared in essentially the same manner by making appropriate adjustments in the reactant charge.

EXAMPLES 37 – 50

The following examples demonstrate the ultrafiltration performance characteristics of membranes prepared from random-block copolymers synthesized as described in Example 36 above.

Tubular membranes are prepared by applying a thin even coating of casting solution to the inner walls of a 0.5 inch inside diameter porous filament wound fiber glass tubular support structure of the kind described in U.S. Pat. No. 3,457,170.

After allowing solvent to evaporate for 2 minutes, the tubular membrane is quenched in tap water for at least 1 hour to gel the film and to leach out solvent. Test solutions contained MgSO$_4$, sucrose, or poly(ethylene oxide) glycols (PEG) of known molecular weight as solutes. Ultrafiltration performance is characterized by measuring product water flux and solute rejection.

Typical test results obtained with 10 inch tubular membranes fabricated from various random-block copolymer compositions and solvents are tabulated below.

| Ex.[a] | Polymer Composition[b] | Casting Solvent Dioxane:DMF[c] | Flux/Rejection (gfd/%)[g] | | | | |
|---|---|---|---|---|---|---|---|
| | | | MgSO$_4$[d] | Sucrose[e] | 1K PEG[f] | 6K PEG[f] | 20 K PEG[f] |
| 37 | 1K15 | 4:1 | 2/15 | 3/18 | 2/40 | 2/86 | 1/90 |
| 38 | 4K35 | 4:1 | 16/39 | 7/34 | 8/64 | 10/46 | 6/90 |
| 39 | 6H35 | 1:1 | 11/52 | *8/33 | 6/70 | 3/93 | 3/92 |
| 40 | 1K15 | 1:1 | 31/30 | *9/33 | 7/78 | 5/92 | 4/92 |
| 41 | 4K5 | 1:1 | 28/43 | 16/36 | 9/71 | 7/42 | 6/92 |
| 42 | 4K15 | 1:1 | 14/42 | 6/36 | 4/72 | 4/92 | 4/92 |
| 43 | 6H35 | 1:4 | 37/27 | 28/25 | 10/67 | 12/92 | 7/92 |
| 44 | 4K15 | 1:4 | 23/31 | *23/13 | 9/60 | 8/95 | 7/92 |
| 45 | 4K70 | 1:1 | 135/2 | 50/7 | 63/5 | 20/36 | 7/85 |
| 46 | 1K15 | 2:3 | *50/42 | NT | 11/50 | NT | NT |
| 47 | 4K5 | 1:1 | NT | NT | 11/76 | NT | NT |
| 48 | 6H35 | 1:1 | NT | NT | 9/81 | NT | NT |
| 49 | 4K15 | 1:1 | NT | NT | 8/81 | NT | NT |
| 50 | 1K15 | 2:3 | NT | NT | 9/82 | NT | NT |

[a]Examples 37 through 46 quenched in ambient temperature water. Examples 47 through 50 quenched in ice water.
[b]Block copolymer compositions are expressed as mole percent ethylene oxide. e.g., 1K15 designates 15 mole percent ethylene oxide in PEO blocks of 1,000 molecular weight, 6H35 designates 35 mole percent ethylene oxide in PEO blocks of 600 molecular weight.
[c]Casting dope formulations 15 – 20 percent by weight of random-block copolymer; DMF equals dimethyl formamide.
[d]5,000 ppm MgSO$_4$ at 450 psi, except * equals 300 psi.
[e]Sucrose 450 psi, except * equals 300 psi.
[f]1KPEG = poly (ethylene oxide) glycol of molecular weight 950 – 1,000.
6KPEG = poly (ethylene oxide) glycol of molecular weight 6,000 – 7,500.
20KPEG = poly (ethylene oxide) glycol of molecular weight 15,000 – 20,000.
[g]Test solutions other than MgSO$_4$ were 6.0 + 1 percent by weight in tap water, operating pressure was 300 psi, linear velocity across the membrane surface was approximately 3 feet per second. Flux is given as gallons per square foot per day (gfd) at 25 ± 2°C.
NT = not tested Results with tubular membranes shown in Examples 40, 46, and 47 through 50 indicate that membranes can be fabricated from bisphenol A/poly (ethylene oxide) glycol polycarbonates by casting from dioxane-DMF mixtures which show a molecular weight cutoff of approximately 1,000.

EXAMPLES 51 – 56

In these examples the resistance of bisphenol A/poly (ethylene oxide) glycol polycarbonate random-block copolymer membranes to damage by wet/dry cycling is demonstrated. Ten inch tubular membranes were tested for tap water flux (25° ± 2°C) and ultrafiltration performance against feed solutions 6 percent by weight in 6K or 20 KPEG at 300 psi. After initial testing, the tubular membranes were allowed to dry in air for the specified lengths of time and retested. Several tubes were subjected to multiple wet/dry cycles.

Test results obtained with various membranes are tabulated below.

| Ex. | Copolymer Composition/ Dioxane:DMF Ratio | Drying Time (Days) | Tap Water Flux(gfd) | PEG Solute (Mol. Wt.) | Flux/Rej. (gfd/%) |
|-----|-----|-----|-----|-----|-----|
| 51 | 4K35 in 4:1 | 0 | 19 | 6K | 9.8/96 |
|    |             | 2.5 | 16 | 6K | 9.0/92 |
| 52 | 4K35 in 4:1 | 0 | 17 | 20K | 5.3/91 |
|    |             | 6 | 11 | 20K | 4.7/92 |
|    |             | 34 | 12 | 20K | 5.4/90 |
| 53 | 4K5 in 1:1  | 0 | 11 | 6K | 7.3/92 |
|    |             | 5 | 15 | 6K | 8.2/93 |
| 54 | 1K15 in 1:4 | 0 | 72 | 6K | 12.5/89 |
|    |             | 9 | — | 6K | 12.5/90 |
|    |             | 12 | 30 | 6K | 10.8/92 |
| 55 | 1K35 in 1:4 | 0 | 118 | 6K | 13.0/84 |
|    |             | 9 | — | 6K | 13.4/90 |
|    |             | 12 | 29 | 6K | 11.4/92 |
| 56 | 4K5 in 1:4  | 0 | 49 | 20K | 7.1/97 |
|    |             | 7 | 26 | 20K | 6.8/90 |
|    |             | 10 | 38 | 20K | 7.5/94 |
|    |             | 14 | 39 | 20K | 7.5/91 |
|    |             | 20 | 38 | 20K | 7.7/94 |
|    |             | 28 | 38 | 20K | 9.2/95 |
|    |             | 38 | 39 | 20K | 8.9/90 |
|    |             | 43 | 36 | 20K | 6.3/90 |

It is thus shown that ultrafiltration performance characteristics are not materially affected by wet/dry cycling.

EXAMPLE 57

In this example the use of a block copolymer, comprised of hydrophobic polystyrene and hydrophilic poly (ethylene oxide) cosegments, as an ultrafiltration membrane material is demonstrated. Following the teaching of Tobolsky, poly (styrene-b-ethylene oxide) was prepared as follows. A 4 ounce polymerization bottle was charged with a solution of 10.4 grams (0.1 mole) styrene, 6.0 grams (0.14 mole ethylene oxide) CARBOWAX 600 and 0.19 grams (8 × 10⁻⁴ mole) bis (1-hydroxy cyclohexyl) peroxide. 1.90 grams (0.11 mole) tolylene 2,4-diisocyanate was then added and the contents purged with nitrogen. After adding dibutyltin dilaurate (two drops), the bottle was heated for 16 hours at 70°. The resulting solid was dissolved in DMF and precipitated into methanol to give, after drying, 11.5 grams (65 percent conversion) of a fibrous material which exhibited infrared absorbances for both polystyrene and ethylene oxide. The composition of the block polymer as determined by NMR was 20 mole percent ethylene oxide and 80 mole percent styrene. Films cast from 6 percent chloroform were flexible, hazy and tough, and became opalescent in water. The polymer exhibited an intrinsic viscosity of 4.2 dl/g in chloroform at 25°.

Membranes cast from 8 percent pyridine solution became opaque upon water quenching and possessed adequate strength for handling. A flat film cast from a 5.4 percent pyridine solution at a 10 mil blade setting measured 35 to 40 μ after a 15 minute evaporation period and water quench. Samples of the film gave the following rejection data on 6 percent feed solutions at 300 psi: 20KPEG – 84 percent rejection at 7 gfd; 1KPEG – 20 percent rejection at 27 gfd. Tap water fluxes ranged from 80 – 200 gfd at 300 psi on various samples of the film.

By the foregoing examples it is shown that segmented copolymers comprising a hydrophilic segment polymer to which is chemically bonded hydrophobic polymer segments and which are soluble in a suitable organic solvent may be fabricated into membranes useful for the ultrafiltration separation of high molecular weight solutes from aqueous media. It is contemplated that numerous variations and modifications of our invention may be made without departing from the scope of this invention. Thus, any block or graft copolymer comprising a hydrophilic polymer chain segment to which is chemically bound hydrophobic segments can be fabricated into functional ultrafiltration membranes of the type described in this disclosure.

We claim:

1. A semipermeable membrane comprising a segmented polymer of chemically bonded hydrophilic segments and hydrophobic segments wherein the hydrophilic segments consist essentially of a copolymer of polyvinyl pyrrolidone which has been prepared in nonaqueous medium and at least about 5 mole percent of graft-reactive site containing hydrophilic monomer consisting essentially of N-methacrolyl-D-glucosamine; and wherein the hydrophobic segments consist essentially of polymethyl methacrylate chemically bonded to the N-methacrolyl-D-glucosamine.

2. The semipermeable membrane of claim 1 wherein the polyvinyl pyrrolidone comprises from about 5 mole percent to about 40 mole percent of the segmented polymer.

3. The semipermeable membrane of claim 1 wherein the polyvinyl pyrrolidone comprises from about 10 mole percent to about 20 mole percent of the segmented polymer.

4. A semipermeable membrane comprising a segmented polymer of chemically bonded hydrophilic segments and hydrophobic segments wherein the hydrophilic segments consist essentially of a copolymer of polyvinyl pyrrolidone which has been prepared in aqueous medium and at least 5 mole percent of graft-reactive site containing hydrophilic monomer consisting essentially of N-methacrolyl-D-glucosamine; and wherein the hydrophobic segments consist essentially of polymethyl methacrylate chemically bonded to both the polyvinyl pyrrolidone and to the N-methacrolyl-D-glucosamine.

5. The semipermeable membrane of claim 4 wherein the polyvinyl pyrrolidone comprises from about 5 mole percent to about 40 mole percent of the segmented polymer.

6. The semipermeable membrane of claim 4 wherein the polyvinyl pyrrolidone comprises from about 10 mole percent to about 20 mole percent of the segmented polymer.

7. Method of forming a membrane comprising a segmented polymer of chemically bonded hydrophilic segments and hydrophobic segments comprising the following steps:

a. forming a linear hydrophilic copolymer of a first hydrophilic monomer which will not itself chemically bond to the hydrophobic portion of the segmented polymer, and a least 5 mole percent of a second hydrophilic monomer having a graft-reactive site, comprising N-methacrolyl-D-glucosamine;

b. grafting the hydrophobic polymer segments to the graft-reactive sites comprising N-methacrolyl-D-glucosamine;

c. dissolving the segmented copolymer thus formed in a solvent which is a better solvent for the hydrophilic portion of the copolymer than it is for the hydrophobic portion;

d. casting the solution on a surface;

e. partially evaporating the solvent; and f. gelling the copolymer in a bath which leachs out the remaining solvent.

8. A semipermeable membrane comprising a block polymer of two hydrophobic segments chemically bonded to a single hydrophilic segment, wherein the hydrophilic segment consists essentially of poly(vinyl pyrrolidone) which has been prepared in aqueous medium, said segment comprising from about 5 mole percent to about 40 mole percent of the block polymer, and wherein the hydrophobic segments consist essentially of polymethyl methacrylate.

9. The membrane of claim 8 wherein the polyvinyl pyrrolidone comprises from about 10 mole percent to about 20 mole percent of the block polymer.

* * * * *